US008069293B1

(12) United States Patent
Rogan et al.

(10) Patent No.: US 8,069,293 B1
(45) Date of Patent: Nov. 29, 2011

(54) FLEXIBLE SERVER NETWORK CONNECTION UPGRADE SYSTEMS AND METHODS

(75) Inventors: Gary Rogan, Los Altos, CA (US); Vikram Karvat, Cupertino, CA (US); Govind Kizhepat, Los Altos Hills, CA (US)

(73) Assignee: QLogic Corporation, Aliso Viejo, CA (US)

( * ) Notice: Subject to any disclaimer, the term of this patent is extended or adjusted under 35 U.S.C. 154(b) by 328 days.

(21) Appl. No.: 12/471,331

(22) Filed: May 22, 2009

(51) Int. Cl.
*H04L 1/00* (2006.01)
*H05K 7/10* (2006.01)
*G06F 13/42* (2006.01)

(52) U.S. Cl. ........ 710/301; 710/300; 710/302; 710/104; 710/105; 370/254; 370/248; 370/473

(58) Field of Classification Search .......... 710/300–302; 370/248, 254, 473
See application file for complete search history.

(56) References Cited

U.S. PATENT DOCUMENTS

| | | | |
|---|---|---|---|
| 6,222,852 B1 | 4/2001 | Gandy | |
| 6,516,352 B1 | 2/2003 | Booth et al. | |
| 6,795,881 B1 | 9/2004 | Bachrach | |
| 6,934,261 B1 | 8/2005 | Vo et al. | |
| 6,996,785 B1 | 2/2006 | Kizhepat et al. | |
| 7,062,595 B2 * | 6/2006 | Lindsay et al. | 710/315 |
| 7,162,554 B1 | 1/2007 | Cole et al. | |
| 7,197,052 B1 | 3/2007 | Crocker | |
| 7,257,079 B1 | 8/2007 | Bachrach | |
| 7,263,108 B2 * | 8/2007 | Kizhepat | 370/473 |
| 7,283,481 B2 | 10/2007 | Huff | |
| 7,356,047 B1 | 4/2008 | Mahalawat et al. | |
| 7,493,481 B1 | 2/2009 | Kizhepat et al. | |
| 7,543,250 B1 | 6/2009 | Kizhepat et al. | |
| 7,620,057 B1 * | 11/2009 | Aloni et al. | 370/395.7 |
| 7,644,194 B2 * | 1/2010 | Lindsay et al. | 710/9 |
| 7,688,867 B1 | 3/2010 | Kizhepat | |
| 7,774,374 B1 | 8/2010 | Kizhepat et al. | |
| 7,925,795 B2 * | 4/2011 | Tamir et al. | 709/250 |
| 2004/0131035 A1 | 7/2004 | Wakeley et al. | |
| 2008/0181212 A1 | 7/2008 | Curcio et al. | |

OTHER PUBLICATIONS

Network Zone—10 Gigabit Ethernet Moves Into Mainstream With Ultra-Flexible Quad-to-10Gig FlexLOM-Enabled Intelligent NICs; 5 pages, Dated Aug. 18, 2008.*
Intel—"Intel 82599 10 Gigabit Ethernet Controller—Transforming the data center through a reliable and unified 10GbE network"; 4 pages, Dated 2009.*

(Continued)

*Primary Examiner* — Brian Misiura
(74) *Attorney, Agent, or Firm* — Law Office of Andrei D Popovici, PC

(57) ABSTRACT

In some embodiments, a system allowing a flexible upgrade of a computer system (e.g. server) to a high-speed network connection comprises base configuration motherboard or network card including a set of low-speed (e.g. 1 Gbps Ethernet) media access controllers (MACs) each connected to a low-speed physical controller (PHY), and a set of high-speed (e.g. 10 Gbps Ethernet) MACs. An expansion card including high-speed PHYs of choice can be connected by an end user to the base configuration motherboard or network card. A flow classifier classifies data sent/received over both high-speed and low-speed ports, and a single driver may control both high- and low-speed ports. One or both of the motherboard and/or expansion card are configured according to a detected type (e.g. physical layer standard, vendor) of expansion card connected to the motherboard and/or type of physical medium connected to the expansion card.

45 Claims, 6 Drawing Sheets

OTHER PUBLICATIONS

HP—"HP NC551m Dual Port FlexFabric 10Gb Converged Network Adapter"; 11 pages, Dated May 10, 2011.*
Emulex—"Dual Port 10GbE Integrated FlexFabric Adapters"; 2 pages, Dated 2010.*
HighBeam Research—"NetXen brings 10GbE into the mainstream with ultraflexible quad-to-1OG FlexLOM-enabled intelligent NICs"; 2 pages, dated Sep. 1, 2008.*
QLogic—"cLOM8214—Multi-port 1GbE and 10GbE to PCie Converged LOM Controller"; 2 pages, Dated 2010.*
QLogic—"cLOM8214-KR—Multi-port 1GbE and 10GbE to PCie Converged LOM Controller"; 2 pages, Dated 2010.*
QLogic—"cLOM8214-RJ—Multi-port 1GbE and 10GbE to PCie Converged LOM Controller"; 2 pages, Dated 2010.*
QLogic—"EP8214—Multi-port 1GbE and 10GbE to PCie Converged Networking Controller"; 2 pages, Dated 2009.*
Karvat, Vikram; Declaration submitted under 37 CFR 1.56, dated Oct. 13, 2011.
Scouras, Ismini, "Network Interface Chip to Stimulate vol. 10-GbE Deployment," EE Times, San Francisco, CA, retrieved from http://www.eetimes.com/electronics-products/other/4083047/Network-interface-chip-to-stimulate-volume-10-GbE-deployment, p. 1-2, Mar. 30, 2006.
Netxen, Inc., "NX 2031 Intelligent NIC Product Brief," NetXen, Inc., Santa Clara, CA, p. 1-2, 2006; the year of publication is sufficiently earlier than the effective U.S. filing date and any foreign priority date so that the particular month of publication is not in issue.
Netxen, Inc., "NX 2035 Intelligent NIC Product Brief," NetXen, Inc., Santa Clara, CA, p. 1-2, 2006; the year of publication is sufficiently earlier than the effective U.S. filing date and any foreign priority date so that the particular month of publication is not in issue.
Netxen, Inc., "NXB-4GCU Intelligent NIC Product Brief," NetXen, Inc., Santa Clara, CA, p. 1-2, 2006; the year of publication is sufficiently earlier than the effective U.S. filing date and any foreign priority date so that the particular month of publication is not in issue.
Netxen, Inc., "NXB-10GXxR Intelligent NIC Product Brief," NetXen, Inc., Santa Clara, CA, p. 1-2, 2006; the year of publication is sufficiently earlier than the effective U.S. filing date and any foreign priority date so that the particular month of publication is not in issue.

* cited by examiner

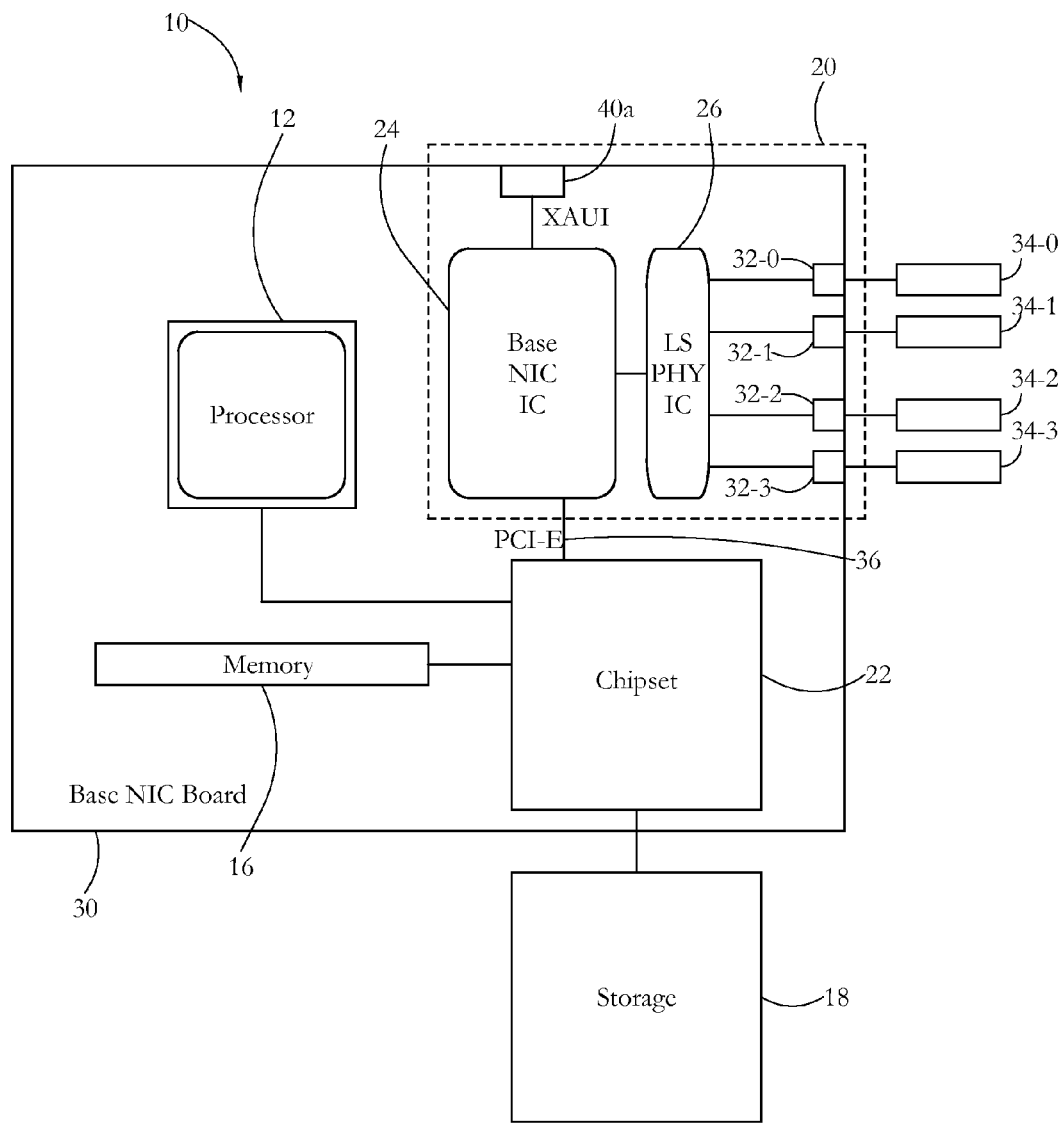
FIG. 1-A

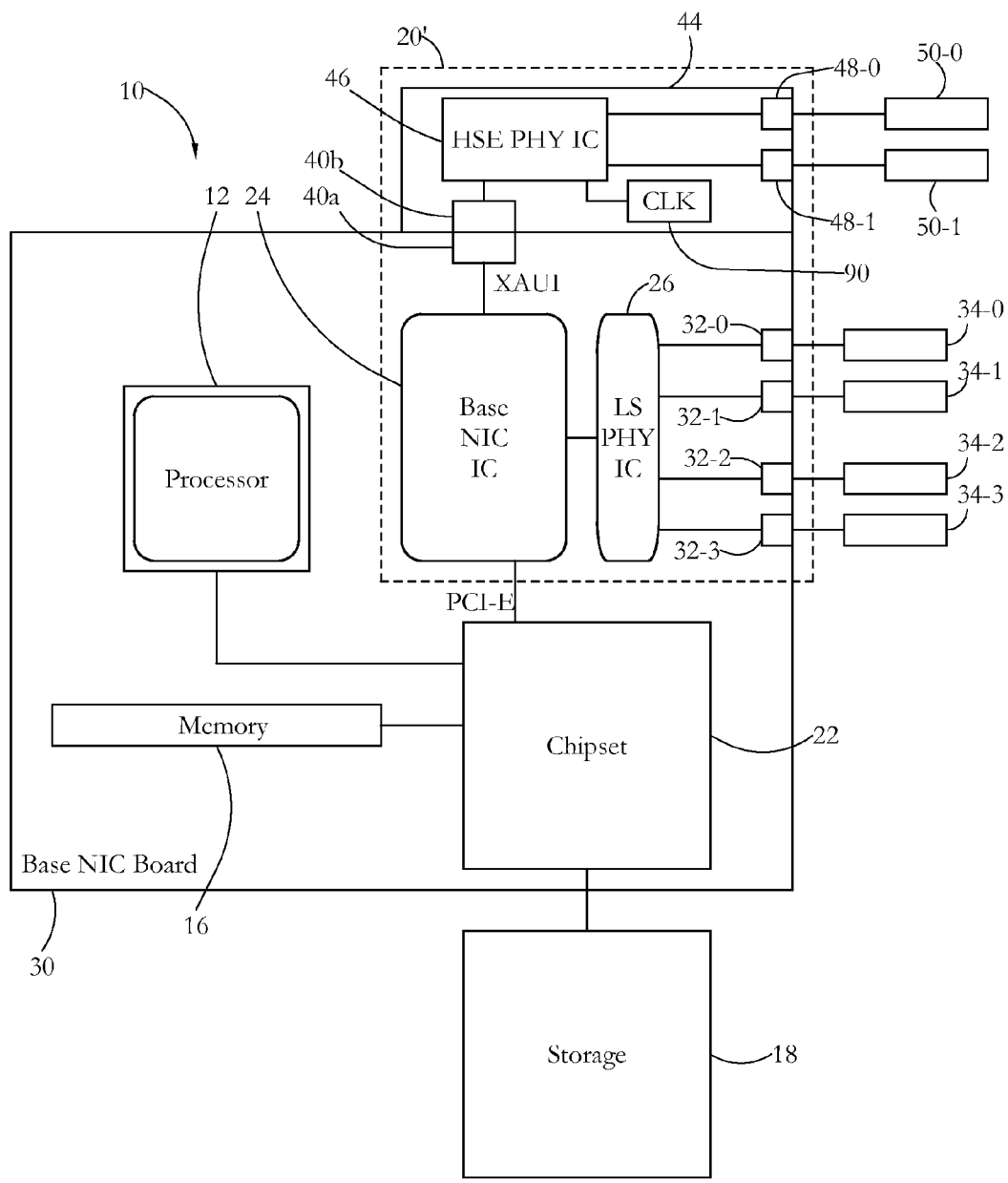
FIG. 1-B

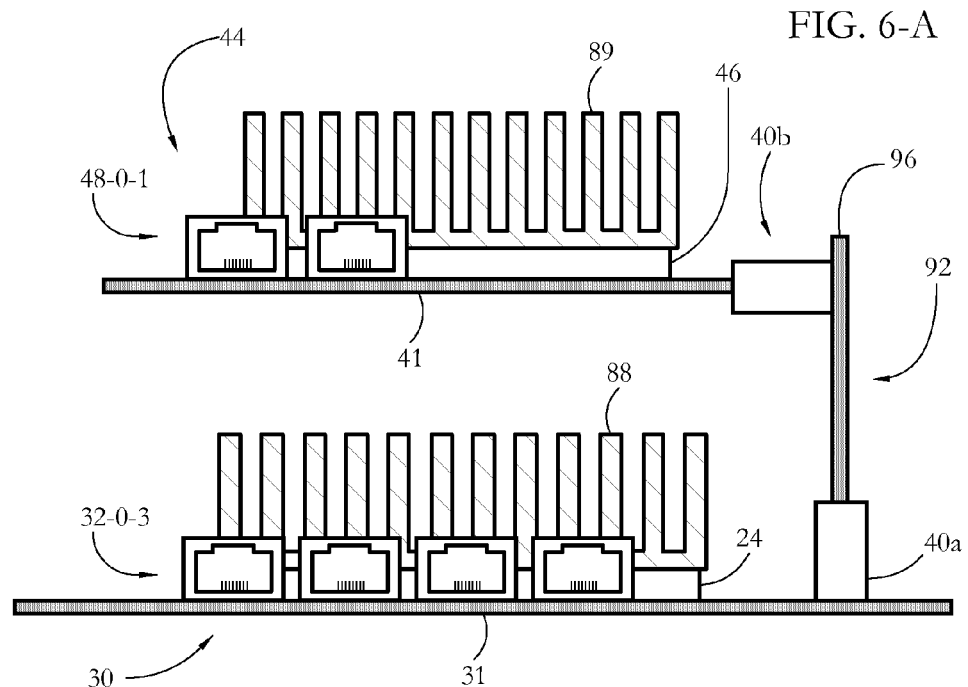
FIG. 6-A
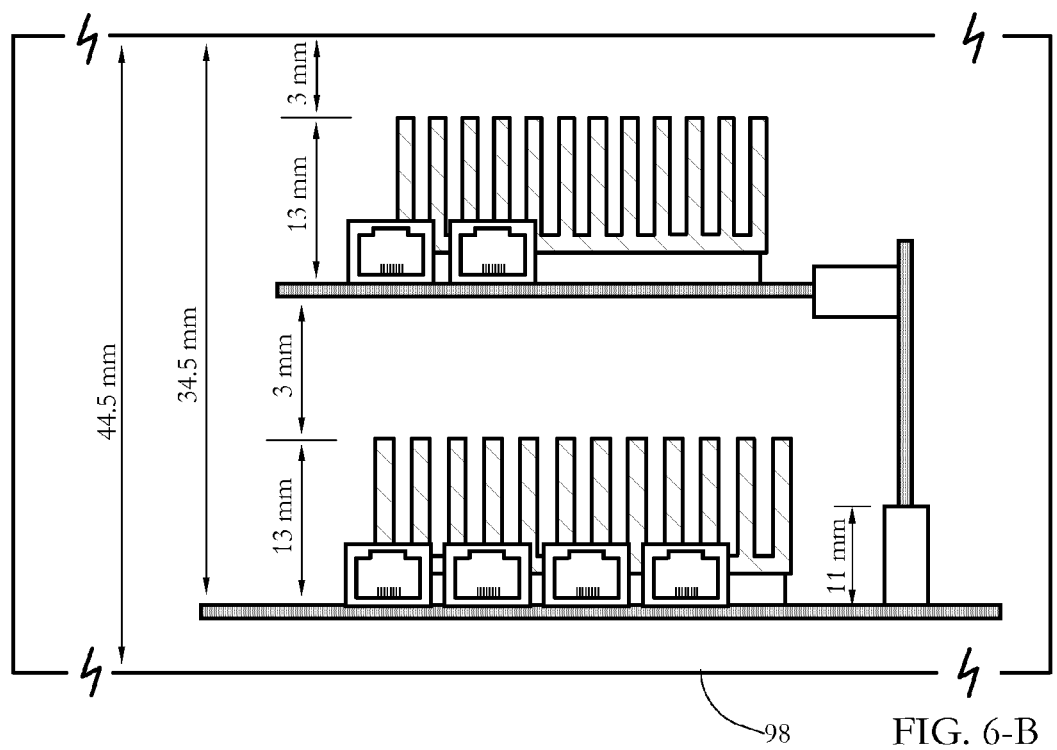
FIG. 6-B

FLEXIBLE SERVER NETWORK CONNECTION UPGRADE SYSTEMS AND METHODS

BACKGROUND

The invention relates to systems and methods for computer networking, and in particular to systems and methods for allowing flexibly upgrading computer server network connections.

The Open Systems Interconnection (OSI) model of electronic communication defines seven layers of functions that enable devices to exchange data over a network. Layer 1, also known as the Physical (PHY) layer, includes functions and devices responsible for the generation, reception, and transmission of physical signals over data links/physical media such as wires, optical fibers, or over the air for wireless transmission. Layer 2, also termed the Data Link layer, provides the hardware and functional means to transfer data between multiple network entities and to detect and possibly correct errors that may occur in the PHY layer. Under the IEEE (Institute for Electrical and Electronic Engineers) standard 802.3, better known under the name Ethernet, the Data Link layer is further divided into a Media Access Control (MAC) sublayer and a Logical Link Control (LLC) sublayer.

In a common computer system such as a server, a network interface controller (NIC) includes PHY and MAC devices, which may be provided as part of a motherboard or part of a dedicated network interface card connected to the motherboard via a connector such as a Peripheral Component Interconnect Express (PCI-E) connector.

In recent years, strong demand for bandwidth has led to a progressive increase in the speed of NICs, leading to the recent advent of 10 Gbps Ethernet technology. 100 Mbps and 1 Gbps Ethernet devices are commonly built around a prevailing physical connection standard, twisted-pair or BASE-T. For 10 Gbps Ethernet devices, technical factors such as special power requirements have so far hindered the widespread adoption of a single physical connection standard. Examples of existing 10 Gbps physical connection solutions include 10 GBase-R, 10 GBase-LR, 10GBase-SR, 10GBase-LX4, 10GBase-T, and 10-Gbase-CX4, among others. The absence of an undisputed 10 Gbps physical connection standard poses special challenges to the widespread adoption of 10 Gbps networking technology in servers.

SUMMARY

According to one aspect, an apparatus includes a computer server motherboard, and a high-speed physical layer device expansion card removably connected to the computer server motherboard. The computer server motherboard comprises a base network interface controller integrated circuit, and a set of low-speed physical layer processor (PHY) devices. The base network interface controller integrated circuit comprises: a set of low-speed media access controllers (MACs), a set of high-speed MACs, and a programmable processor connected to the low-speed MACs and the high-speed MACs. Each low-speed PHY device is connected to a corresponding low-speed MAC for the base network interface controller integrated circuit. The high-speed physical layer device expansion card comprises a set of high-speed PHY devices, each high-speed physical layer controller being connected to a high-speed MAC of the base network interface controller integrated circuit. The programmable processor is programmed to determine a type of the high-speed physical layer device expansion card connected to the computer server motherboard, and configure the base network interface controller integrated circuit or the high-speed physical layer device expansion card according to the determined type of the high-speed physical layer device expansion card. Determining the type of the high-speed physical layer device expansion card includes determining a physical layer standard of the high-speed physical layer device expansion card.

According to another aspect, a method comprises removably connecting a high-speed physical layer device expansion card to a computer server motherboard. The computer server motherboard comprises a base network interface controller integrated circuit comprising a set of low-speed media access controllers (MACs) and a set of high-speed MACs. The high-speed physical layer device expansion card comprises a set of high-speed physical layer processor (PHY) devices, each high-speed PHY device being connected to a high-speed MAC of the base network interface controller integrated circuit. The method further comprises employing a programmable processor of the computer server motherboard to determine a type of the high-speed physical layer device expansion card connected to the computer server motherboard, and configure the base network interface controller integrated circuit or the high-speed physical layer device expansion card according to the determined type of the high-speed physical layer device expansion card. Determining the type of the high-speed physical layer device expansion card includes determining a physical layer standard of the high-speed physical layer device expansion card.

According to another aspect, an apparatus comprises a base network interface controller board, and a high-speed physical layer device expansion card removably connected to the base network interface controller board. The base network interface controller board comprises a set of low-speed media access controllers (MACs), a set of low-speed physical layer processor (PHY) devices, each low-speed PHY device being connected to a low-speed MAC, and a set of high-speed MACs. The high-speed physical layer device expansion card comprising a set of high-speed PHY devices, each high-speed PHY device being connected to a high-speed MAC of the base network interface controller board. The base network interface controller board is configured to determine a type of the high-speed physical layer device expansion card connected to the base network interface controller board, and configure the base network interface controller board or the high-speed physical layer device expansion card according to the determined type of the high-speed physical layer device expansion card. Determining the type of the high-speed physical layer device expansion card includes determining a physical layer standard of the high-speed physical layer device expansion card.

According to another aspect, a method comprises removably connecting a high-speed physical layer device expansion card to a base network interface controller board. The base network interface controller board comprises a set of low-speed media access controllers (MACs), a set of low-speed physical layer processor (PHY) devices, each low-speed PHY device being connected to a low-speed MAC, and a set of high-speed MACs. The high-speed physical controller expansion card comprises a set of high-speed PHY devices, each high-speed PHY device being connected to a high-speed MAC of the base network interface controller integrated circuit. The method further comprises employing the base network interface controller board to determine a type of the high-speed physical layer device expansion card connected to the base network interface controller board, and configure the base network interface controller board or the high-speed physical layer device expansion card according to the determined type of the high-speed physical layer device expansion card. Determining the type of the high-speed physical layer device expansion card includes determining a physical layer standard of the high-speed physical layer device expansion card.

According to another aspect, an apparatus comprises a base network interface controller integrated circuit, and a high-speed physical layer device expansion card connector coupled to the base network interface controller integrated circuit, for removably connecting the base network interface controller integrated circuit to a high-speed physical layer device expansion card. The a base network interface controller integrated circuit comprises a set of low-speed media access controllers (MACs), a set of high-speed MACs, and a programmable processor connected to the low-speed MACs and high-speed MACs. The high-speed physical controller expansion card comprises a set of high-speed physical layer processor (PHY) devices. Connecting the base network interface controller integrated circuit to the high-speed physical controller expansion card connects each high-speed PHY device of the high-speed physical layer device expansion card to a high-speed MAC of the base network interface controller integrated circuit. The programmable processor is programmed to determine a type of the high-speed physical layer device expansion card connected to the base network interface controller integrated circuit, and configure the base network interface controller integrated circuit or the high-speed physical layer device expansion card according to the determined type of the high-speed physical layer device expansion card. Determining the type of the high-speed physical layer device expansion card includes determining a physical layer standard of the high-speed physical layer device expansion card.

BRIEF DESCRIPTION OF THE DRAWINGS

The foregoing aspects and advantages of the present invention will become better understood upon reading the following detailed description and upon reference to the drawings where:

FIG. 1-A shows an exemplary computer system in a base (low-speed) configuration, according to some embodiments of the present invention.

FIG. 1-B shows the exemplary computer system of FIG. 1-A in an upgraded (low- and high-speed) configuration, according to some embodiments of the present invention.

FIG. 6-A shows a lateral view of an exemplary 1 U rack mount hardware configuration including a high-speed physical controller expansion riser card attached above a system motherboard according to some embodiments of the present invention.

FIG. 6-B shows exemplary dimensions of the hardware configuration of FIG. 6-A according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. Unless otherwise specified, any recited "or" is a non-exclusive or; for example, a parameter of a first element or a second element may be a parameter of the first element alone, of the second element alone, or of the first and second elements. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, an indicator of some quantity/data may be the quantity/data itself, or an indicator different from the quantity/data itself. Unless otherwise specified, the terms low-speed and high-speed are relative terms and are not limited to particular exemplary speeds illustrated (e.g. 10 Gbps for high-speed, and 1 Gbps or lower for low-speed); in general a recited low speed is understood to be lower than a recited high speed. For example, in a system in which a low speed is 10 Gbps, a potential high speed may be 40 Gbps or 100 Gbps. Any recitation of a processor encompasses both single-core processors and multi-core processors, wherein each core can be a processor itself. Unless otherwise stated, the statement that a processor or other recited element performs a step encompasses the processor or other recited element performing or directing the step optionally in conjunction with or with the assistance of other logic or processor(s). Unless otherwise specified, computer readable media encompass magnetic, optical, semiconductor and other storage media (e.g. hard drives, optical disks, flash memory, DRAM), as well as communications links such as conductive cables, copper PCB traces, and fiber optic links. According to some embodiments, the present invention provides computer-readable media encoding instructions to perform the steps described herein.

The following description illustrates embodiments of the invention by way of example and not necessarily by way of limitation.

Figure 2:
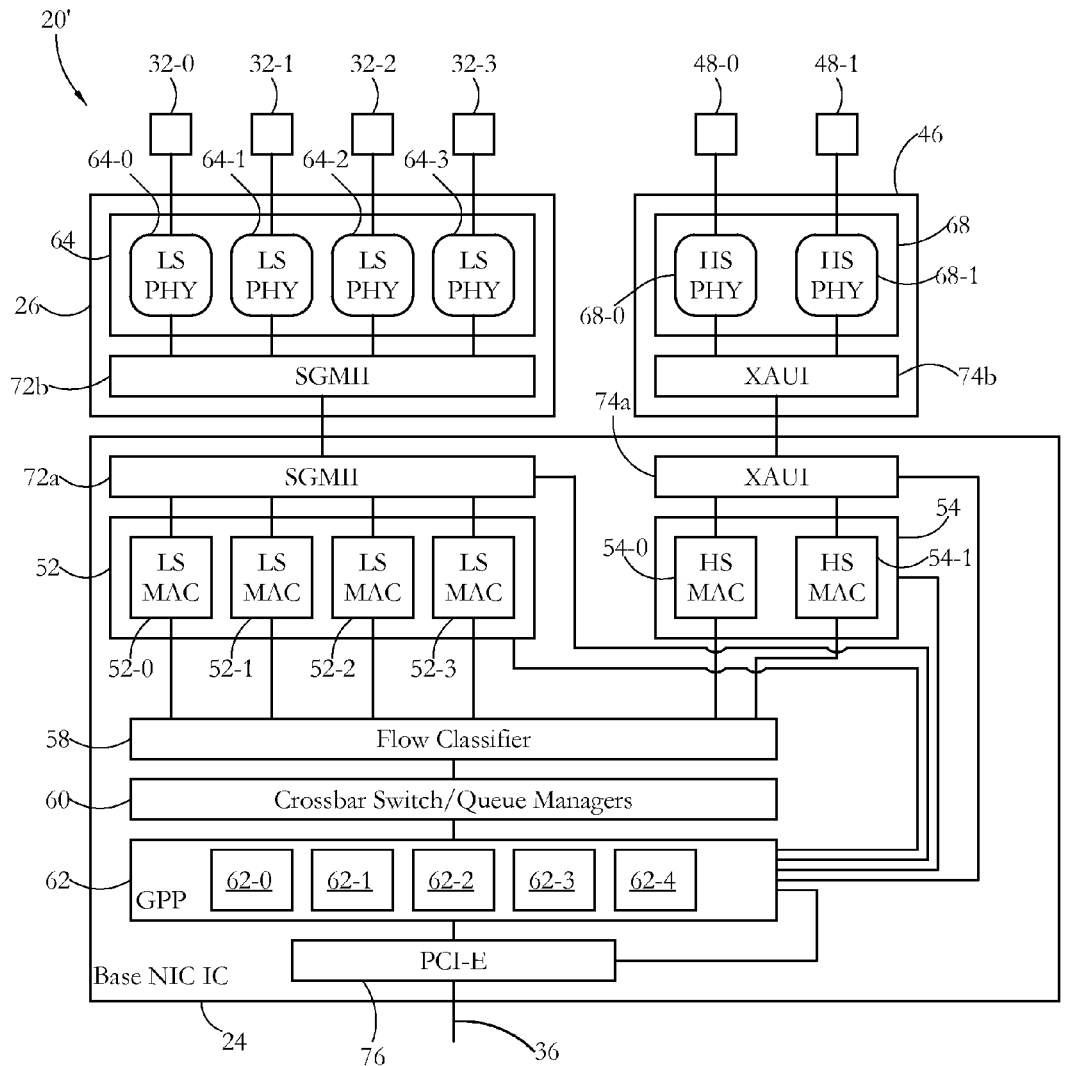
FIG. 2 shows a base network interface controller integrated circuit including low- and high-speed MAC devices and low-speed PHY devices, and an associated high-speed physical controller expansion card including high-speed PHY-devices, according to some embodiments of the present invention.

FIGS. 1 and 2 show an exemplary computer system 10 and corresponding network interface controller (NIC) 20 in a base (low-speed) configuration and an upgraded (low- and high-speed) configuration, respectively, according to some embodiments of the present invention. In the low-speed configuration, system 10 is capable of communication over one or more low-speed ports. In the upgraded configuration, system 10 is capable of communication over the low-speed ports and over one or more high-speed ports. In exemplary embodiments, the high-speed ports may include 10 Gbps, 40 Gbps, and/or 100 Gbps ports, while the low-speed ports may include 1 Gbps and/or 100 Mbps ports. In a particular example, the high-speed ports are 10 Gbps ports, while the low-speed ports are 1 Gbps ports. Other examples of potential high/low speed pairs include 40/10 Gbps, 8/4 Gbps, 16/8 Gbps, 16/4 Gbps, and 100/40 Gbps.

System 10 may be a server computer in a tower, rack or blade configuration. System 10 includes a base network interface controller circuit board 30. In some embodiments, base circuit board 30 may be a computer server motherboard (mainboard), backplane, daughterboard (daughter card), or dedicated network card (e.g. I/O riser card) which in turn is mounted on another printed circuit board such as a motherboard, backplane, or daughterboard. The description below will focus primarily on a base circuit board 30 formed by a motherboard, illustrated in FIGS. 1-A-B.

Base circuit board 30 includes a number of components mounted on a printed circuit board support, including a general purpose processor 12, a memory 16, network interface controller (NIC) 20, and a chipset 22. In some embodiments, NIC 20 may be formed by a distinct network card including a separate PCB substrate mounted on a motherboard. System 10 may also include a non-volatile storage medium 18 connected to or forming part of base circuit board 30. Processor 12, memory 16, storage medium 18 and NIC 20 are interconnected through chipset 22. Some or all components (e.g. processor 12 and memory 16) may also be interconnected through direct connections. Processor 12 may be a microprocessor including one or more processing units or cores, and may employ an x86, RISC, or other processor architecture. Memory 16 may include volatile random access memory (RAM) and/or non-volatile read-only memory (ROM). Storage medium 18 may include a computer-readable medium such as a hard drive or semiconductor storage medium. Chipset 22 may include a memory and/or graphics controller, commonly called Northbridge, and a peripheral and/or I/O controller, commonly called Southbridge. NIC 20 is connected to the peripheral controller of chipset 22 through an interface 36, which may be an interface including a plurality of point-to-point serial links. Such an interface may be a Peripheral Component Interconnect (PCI) interface such as a PCI Express (PCI-E) interface.

In some embodiments, system 10 employs a common network interface driver for controlling the operation of all ports of NIC 20, including multiple low- and/or high-speed ports. Processor 12 is configured to execute a set of driver software instructions implementing a common network interface driver for communicating low-speed and high-speed port data through low-speed and high-speed ports of NIC 20, respectively. Such software instructions may be stored in storage medium 18 and/or memory 16, and retrieved by processor 12 for execution. In some embodiments, for example in embodiments employing a Microsoft Windows operating system, processor 12 may employ multiple instantiations of the common network interface driver, with each driver instantiation controlling one corresponding low- or high-speed port. The different driver instantiations are distinct but identical. In some embodiments, for example in embodiments employing other operating systems, a single instantiation of the common network interface driver may be used to control multiple ports. In the description below, references to the common network interface driver encompass both single-instantiation and multi-instantiation drivers. The driver communicates with NIC 20 over interface 36, which may be formed by a single PCI-E root port and associated lanes.

In some embodiments, the common network interface driver may be used to perform a set of port recognition and configuration operations. In particular, the common network interface driver automatically detects whether any low- and high-speed ports are connected/operable and the corresponding port speed, and configures a set of port parameters for each low- and/or high-speed port according to the detected port speed. Configurable port parameters may include interrupt coalescing thresholds, receive (Rx) and transmit (Tx) descriptor ring sizing, bufferpool size, and speed/duplex supported configurations. The interrupt coalescing threshold sets a threshold condition (e.g. number of packets and/or elapsed time period) for delaying delivery of packets from NIC 20 to processor 12 until the threshold condition is met. The Rx and Tx descriptor rings are memory areas shared by NIC 20 and processor 12, and used for storing control information such as status, length, and address pointers for transmit and receive buffers used by each port of NIC 20. A port bufferpool size is the size of a buffer allocated to a given port. Exemplary speed/duplex supported configurations include any combinations of 100 Mbps/1 GBbps/10 GBbps and full-duplex/half-duplex configurations.

In the base configuration shown in FIG. 1-A, NIC 20 includes a base NIC integrated circuit (IC) 24, a low-speed PHY unit 26 including a plurality of low-speed physical layer processor devices (PHYs) connected to base NIC IC 24, a plurality of low-speed Ethernet network physical connectors 32-0-3 connected to low-speed PHY unit 26, and a high-speed expansion connector 40a connected to base NIC 24. Base NIC IC 24 is connected to chipset 22 over PCI-E interface 36. Base NIC IC 24 comprises a plurality of high- and low-speed media access controllers (MACs) as described below. In some embodiments, low-speed connectors 32-0-3 are RJ-45/8P8C connectors suitable for establishing Ethernet network connections at one or more speeds such as 1 Gbps, 100 Mbps and/or 10 Mbps. Connectors 32-0-3 allow system 10 to connect to a computer network via physical media (data links) 34-0-3 such as optical fiber modules, optical fibers, or conductive wire cables. High-speed expansion connector 40a may be an x8 PCI-E or other suitable connector for providing a XAUI or other high-speed interface between base NIC IC 24 and a high-speed physical controller expansion card, as described below. In some embodiments, as shown in FIG. 1-A, NIC 20 may be mounted on base circuit board 30. In some embodiments, NIC 20 may be mounted on a separate, dedicated network interface card connected to base circuit board 30 through a connector such as a PCI-E connector.

System 10 may be upgraded by an end-user from the base (low speed) configuration shown in FIG. 1-A to an upgraded (low- and high-speed) configuration as shown in FIG. 1-B. In the high-speed configuration shown in FIG. 1-B, an upgraded NIC configuration 20' includes a high-speed physical device expansion (HSE) card 44 connected to the base-configuration NIC 20 through matching high-speed expansion connectors 40a-b. HSE card 44 includes an expansion connector 40b, which mates with connector 40a to connect base circuit board 30 and HSE card 44, and a set of high-speed Ethernet physical connectors 48-0-1 for connecting HSE card to corresponding external physical media 50-0-1 such as optical fiber modules, optical fibers, or conductive wire cables. High-speed physical connectors 48-0-1 may include XFP, SFP+, CX4, and/or 10 GBaseT connectors, for example. A HSE card 44 with suitable high-speed physical connectors may be chosen by an end user according to desired applications. For example, XFP or SFP+ optical interconnects may be used for rack-to-rack connectivity in a data center, while CX4 copper or SFP+ twinax connectors may be used for in-rack and clustering connectivity. High-speed expansion (HSE) card 44 further includes a high-speed clock generator 90, and a high-speed expansion physical processor device integrated circuit (HSE PHY IC) 46 connected to high-speed clock generator 90 and connectors 40b, 48-0-1. Clock generator 90 generates clock signals for the operation of HSE PHY IC 46. In some embodiments in which the high-speed connections are 10 Gbps connections, clock generator 90 may be capable of generating a current mode logic (CML) clock signal at 156.25 MHz.

FIG. 2 illustrates schematically the internal structures of base NIC IC 24, low-speed PHY IC 26, and HSE PHY IC 46 according to some embodiments of the present invention. HSE PHY IC 46 is further described with reference to FIG. 3. FIG. 2 illustrates base NIC IC 24 as part of the upgraded NIC configuration 20', when base NIC IC 24 is connected to HSE PHY IC 46. Base NIC IC 24 includes a multi-port low-speed MAC unit 52 including a plurality of low-speed MACs 52-0-3, a multi-port high-speed MAC unit 54 including a plurality of high-speed MACs 54-0-1, a flow classifier 58 connected to low-speed MACs 52-0-3 and high-speed MACs 54-0-3, a queuing crossbar switch 60 connected to flow classifier 58, and a general-purpose programmable processor 62 comprising a plurality of programmable cores (processors) 62-0-4 connected to the various functional blocks of base NIC IC 24 referenced above. Base NIC IC 24 further includes a low-speed MAC-PHY interface 72a connected to low-speed MACs 52-0-3, a high-speed MAC-PHY expansion interface 74a connected to high-speed MACs 54-0-3, and a host interface 76 connected to programmable processor 62. In some embodiments in which low-speed ports are 1 Gbps and high-speed ports are 10 Gbps ports, low-speed MAC-PHY interface 72a comprises one or more 1 Gbps serial gigabit media independent interfaces (SGMII), while high-speed MAC-PHY expansion interface 74a comprises one or more 10 Gbps X-Attachment Unit Interfaces (XAUI). Host interface 76 may be a PCI-E interface or other suitable interface for connecting to chipset 22 and/or processor 12 (FIGS. 1, 2).

Low-speed PHY IC 26 includes a multi-port low-speed PHY unit 64 including a plurality of low-speed PHYs 64-0-3 connected to corresponding low-speed MACs 52-0-3 through a low-speed PHY-MAC interface 72b, and to corresponding low-speed physical connectors 32-0-3. High-speed PHY IC 46 includes a multi-port high-speed PHY unit 68 including a plurality of high-speed speed PHYs 68-0-1 connected to corresponding high-speed MACs 54-0-1 through a high-speed PHY-MAC expansion interface 74b, and to corresponding high-speed physical connectors 48-0-1. In some embodiments in which low-speed ports are 1 Gbps and high-speed ports are 10 Gbps ports, low-speed PHY-MAC interface 72b comprises one or more 1 Gbps serial gigabit media independent interfaces (SGMII), while high-speed PHY-MAC interface 74b comprises one or more 10 Gbps X-Attachment Unit Interfaces (XAUI).

Each PHY 64-0-3, 68-0-1 implements a physical layer (OSI layer 1) process to convert voltage pulses received from physical connectors 32-0-3, 48-0-1 into binary values (I/O) transmitted to MACs 52-0-3, 54-0-1 (for received data), and correspondingly to convert binary values into appropriate physical connector voltage pulses (for sent data). Each MAC 52-0-3, 54-0-1 has an associated unique MAC address. Each MAC 52-0-3, 54-0-1 implements a MAC layer (OSI layer 2) process to convert bit values received from PHYs 64-0-3, 68-0-1 into frames, and correspondingly to convert frames into appropriate binary sequences for transmission to PHYs 64-0-3, 68-0-1.

Flow classifier 58 comprises an ingress flow classifier for classifying incoming data received from low-speed MACs 52-0-3 and high-speed MACs 54-0-1, and an egress flow classifier for classifying outgoing data sent to low-speed MACs 52-0-3 and high-speed MACs 54-0-1. Flow classifier 58 receives low-speed and high-speed port data from low-speed MACs 52-0-3 and high-speed MACs 54-0-1, and posts the data to appropriate linked-list queues maintained by queuing crossbar switch 60, for retrieval by programmable cores 62-0-4. Flow classifier 58 routes outgoing data to the appropriate port and incoming data to the appropriate internal destination (e.g. memory address space and/or queue). To facilitate steering of data to appropriate internal or external destinations, flow classifier 58 may perform classification operations according to parameters such as, without limitation, the identity of the source or destination port, the type of flow (e.g. local reservation output (LRO) or otherwise), the TCP connection associated with the data, and any other desired parameters. Specific source and/or destination parameters used by flow classifier 58 to perform data classification may include, without limitation, MAC address, IP address, TCP port, VLAN tag, priority tag, Ethertype, and physical port ID.

In some embodiments queuing crossbar switch 60 includes a crossbar switch connected to programmable cores 62-0-4 and to one or more internal hardware-implemented linked-list queue managers as described in U.S. patent application Ser. No. 10/792,597, filed Mar. 2, 2004, "On-Chip Switching using Hardware-Implemented Linked-List Management," which is herein incorporated by reference. Each queue manager of queuing crossbar switch 60 maintains a plurality of linked-list data queues, and en-queues and de-queues data received from and sent to MACs 52-0-3, 54-0-1 and programmable cores 62-0-4. The crossbar switch is capable of establishing connections between any of the queue managers and any of the programmable cores 62-0-4. The queues may be accessed by read and/or write operations initiated by flow classifier 58, programmable cores 62-0-4, and/or host interface 76.

Each core 62-0-4 of programmable processor 62 is capable of executing a set of instructions for facilitating data transfer between the various ports of NIC 20 (in its base and upgraded configurations) and host processor 12 and/or memory 16 (through host interface 76), and for configuring the operation of NIC 20. Programmable processor 62 may have data path connections through queuing crossbar switch 60 and host interface 76, as well as direct control path connections to various units of base NIC IC 24, including expansion interfaces 72a, 74a, and MAC units 52, 54. Instructions executed by programmable processor 62 may be stored in memory 16 and/or a non-volatile firmware storage unit connected to programmable processor 62. In some embodiments, programmable processor 62 sets up direct memory access (DMA) transactions to transfer data between flow classifier 58 and host processor 12. Firmware running on programmable processor 62 may also be used to perform a number of base NIC and high-speed expansion card configuration steps described below with reference to FIG. 4. In some embodiments, some or all of the steps described below as performed by processor 62 may be performed by special-purpose hardware (logic).

Figure 3:
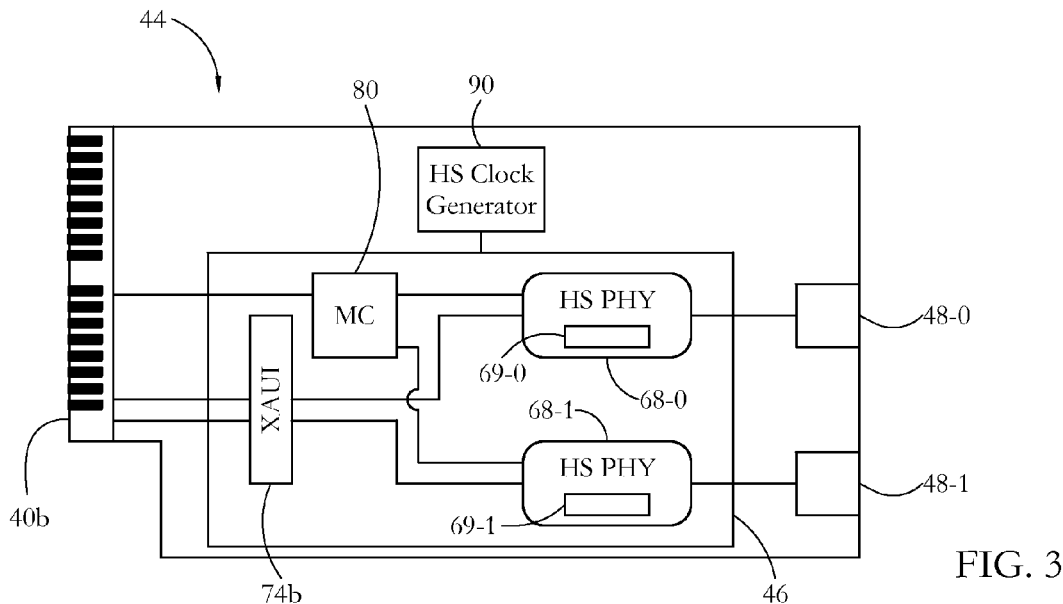
FIG. 3 illustrates an exemplary high-speed physical controller expansion card according to some embodiments of the present invention.

As shown in FIG. 3, in some embodiments HSE PHY IC 46 includes a microcontroller 80 connected to connector 40b and high-speed PHYs 68-0-1. Microcontroller 80 is capable of executing a set of high-speed expansion firmware instructions for configuring the operation of HSE card 44, and in particular for configuring the operation of one or more DSP engines of PHYs 68-0-1 as described below with reference to FIG. 4. In some embodiments, some or all of the steps described below as performed by microcontroller 80 may be performed by special-purpose hardware (logic). Each high-speed PHY 68-0-1 includes or is connected to a set of configuration registers 69-0-1, respectively. Configuration registers 69-0-1 store data identifying the type (physical layer standard and optionally vendor) of HSE card 44, and/or the type of physical media connected to PHYs 68-0-1 (if any).

Connector 40*b* includes multiple one-bit pins, including power, control and data pins suitable for providing a PHY-MAC interface. At least part of such an interface may be configured according to the X Attachment Unit Interface (XAUI) standard, which forms part of the IEEE 802.3 standard. Table 1 shows an exemplary assignment of pins to signals for a XAUI interface implemented using x8 PCI-E connectors, for a 10 Gbps expansion card:

TABLE 1

| Pin # | Side B | | Side A | |
|---|---|---|---|---|
| | Name | Description | Name | Description |
| 1 | +12 V | 12 V Power Input | RSVD | Reserved |
| 2 | +12 V | 12 V Power Input | +12 V | 12 V Power Input |
| 3 | +12 V | 12 V Power Input | +12 V | 12 V Power Input |
| 4 | GND | Ground | GND | Ground |
| 5 | XAUI_MDC | Management Interface Clock | PHY0_LED0 | LED input for PHY0 status |
| 6 | XAUI_MDIO | Management Interface Data | PHY0_LED1 | LED input for PHY0 status |
| 7 | GND | Ground | PHY1_LED0 | LED input for PHY1 status |
| 8 | +3.3 V | 3.3 V Power Input | PHY1_LED1 | LED input for PHY1 status |
| 9 | PHY0_RST_N | Reset Input for PHY0 | +3.3 V | 3.3 V Power Input |
| 10 | PHY1_RST_N | Reset Input for PHY1 | +3.3 V | 3.3 V Power Input |
| 11 | PHY_INT_N | Interrupt from PHYs | RSVD | Reserved |
| 12 | RSVD | Reserved | GND | Ground |
| 13 | GND | Ground | SYSCLK_IN_P | 156.25 MHz reference clock for BASE NIC IC |
| 14 | XG1_RX0_P | XG1 Receive input to BASE | SYSCLK_IN_N | |
| 15 | XG1_RX0_N | NIC IC Lane 0 | GND | Ground |
| 16 | GND | Ground | XG1_TX0_P | XG1 Transmit Output to BASE NIC IC Lane 0 |
| 17 | MOD0_PRSNT_N | 10G Module 0 Present | XG1_TX0_N | |
| 18 | GND | Ground | GND | Ground |
| 19 | XG1_RX1_P | XG1 Receive input to BASE NIC IC Lane 1 | RSVD | Reserved |
| 20 | XG1_RX1_N | | GND | Ground |
| 21 | GND | Ground | XG1_TX1_P | XG1 Transmit Output to BASE NIC IC Lane 1 |
| 22 | GND | Ground | XG1_TX1_N | |
| 23 | XG1_RX2_P | XG1 Receive input to BASE NIC IC Lane 2 | GND | Ground |
| 24 | XG1_RX2_N | | GND | Ground |
| 25 | GND | Ground | XG1_TX2_P | XG1 Transmit Output to BASE NIC IC Lane 2 |
| 26 | GND | Ground | XG1_TX2_N | |
| 27 | XG1_RX3_P | XG1 Receive input to BASE NIC IC Lane 3 | GND | GND |
| 28 | XG1_RX3_N | | GND | GND |
| 29 | GND | GND | XG1_TX3_P | XG1 Transmit Output to BASE NIC IC Lane 3 |
| 30 | RSVD | Reserved | XG1_TX3_N | |
| 31 | MOD1_PRSNT_N | XG0 Present | GND | GND |
| 32 | GND | GND | RSVD | Reserved |
| 33 | XG0_RX0_P | XG0 Receive input to BASE NIC IC Lane 0 | RSVD | Reserved |
| 34 | XG0_RX0_N | | GND | GND |
| 35 | GND | Ground | XG0_TX0_P | XG0 Transmit Output to BASE NIC IC Lane 0 |
| 36 | GND | Ground | XG0_TX0_N | |
| 37 | XG0_RX1_P | XG0 Receive input to BASE NIC IC Lane 1 | GND | Ground |
| 38 | XG0_RX1_N | | GND | Ground |
| 39 | GND | Ground | XG0_TX1_P | XG0 Transmit Output to BASE NIC IC Lane 1 |
| 40 | GND | Ground | XG0_TX1_N | |
| 41 | XG0_RX2_P | XG0 Receive input to BASE | GND | Ground |
| 42 | XG0_RX2_N | | GND | Ground |

TABLE 1-continued

| Pin # | Side B | | Side A | |
|---|---|---|---|---|
| | Name | Description | Name | Description |
| 43 | GND | Ground | XG0_TX2_P | XG0 Transmit Output to BASE NIC IC Lane 2 |
| 44 | GND | Ground | XG0_TX2_N | |
| 45 | XG0_RX3_P | XG0 Receive input to BASE NIC IC Lane 3 | GND | Ground |
| 46 | XG0_RX3_N | | GND | Ground |
| 47 | GND | Ground | XG0_TX3_P | XG0 Transmit Output to BASE NIC IC Lane 3 |
| 48 | RSVD | Reserved | XG0_TX3_N | |
| 49 | GND | Ground | GND | Ground |

The MDC and MDIO pins in Table 1 provide a control channel for PHY-MAC intercommunication. Together with the PHY_INT_N pin, which allows sending interrupts from each PHY to its corresponding MAC, and optionally other pins, the MDC and MDIO pins may be used to interrogate the PHYs, determine the type (physical layer standard and vendor) of PHY and mode of operation, and control the download of firmware to microprocessor 80 and the initialization and configuration of HSE PHY IC 46 according to the type of HSE card. The MOD_PRSNT_N pins may be used to indicate whether physical media (e.g. optical modules) are connected to connectors 48-0-1. The XG pins listed in Table 1 provide a datapath for MAC-PHY intercommunication.

Figure 4:
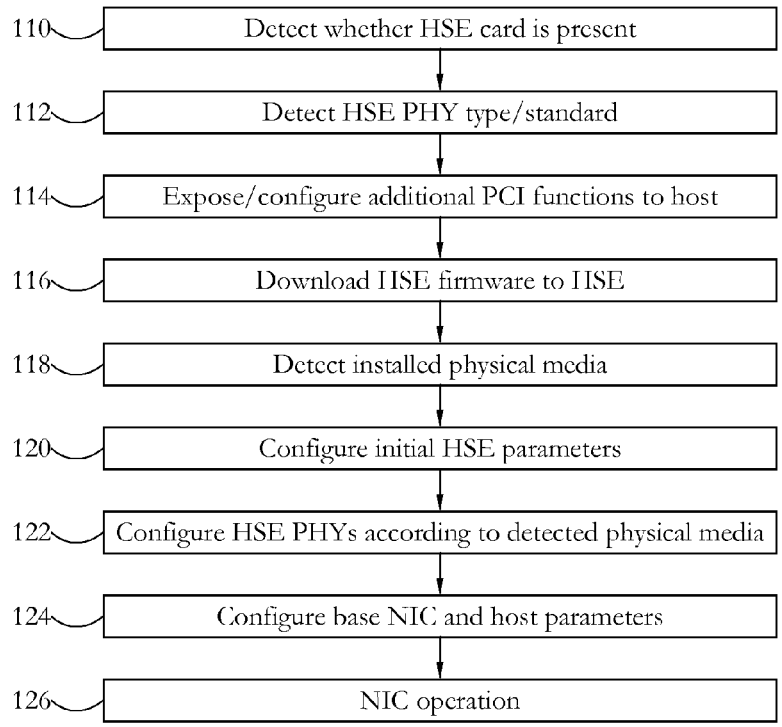
FIG. 4 shows an exemplary set of steps performed by firmware running on a NIC control processor according to some embodiments of the present invention.

FIG. 4 shows an exemplary set of initialization and configuration steps performed by firmware running on the programmable processor 62 of base NIC IC 24 (FIG. 3) and/or the microcontroller 90 of HSE card 44, according to some embodiments of the present invention. In a step 110, programmable processor 62 determines whether HSE card 44 is present, i.e. connected through connector 40*a*. The determination may include measuring an appropriate current/voltage level to determine whether one or more contacts of connector 40*a* are connected externally. If HSE card 44 is present, the type of HSE card is identified in a step 112. An indicator of the card type may include an indicator of a physical layer (PHY) standard (e.g. XFP, SFP+, CX4, 10 GBaseT) and/or additional information on device properties to be used for configuring HSE card 44 and/or base NIC IC 24 (e.g. the manufacturer name and product number/identifier). Step 112 may include using the MDC/MDIO pins listed in Table 1 to interrogate HSE card 44 and receive a response indicating the card type (physical layer standard), e.g. by reading at least part of the contents of configuration registers 69-0-1. A number of subsequent steps depend on the determined type/standard of HSE card, as described below. For example, the type of detected HSE card may determine whether a firmware download to HSE card 44 is to be performed in a step 116 and the identity of the firmware to be downloaded, and whether an increased number of PCI-E functions should be exposed to host processor 12 in a step 114.

In a step 114, programmable processor 62 determines the number of PCI-E functions to be exposed to host processor 12, according to the number of ports of HSE card 44 and the operating system running on host processor 12. If desired, additional PCI functions are exposed to host processor 12 and configured to reflect a different port set identity by appropriately configuring the system PCI-E configuration space. Step 114 may include changing a subsystem ID in the register space of host interface 76, indicating to host processor 12 the numbers and types of available ports. For example, an original subsystem ID (e.g. a first four-character hexadecimal code used in a PCI configuration space) which identifies 4×1 Gbps ports may be changed to a revised subsystem ID (e.g. a second four-character hexadecimal code) which identifies 4×1 Gbps ports and 2×10 Gbps ports.

In a step 116, programmable processor 62 and/or microcontroller 80 direct the upload of HSE firmware to microcontroller 80 through connectors 40a-b. The type of firmware, and whether any firmware is to be downloaded at all, may be determined by programmable processor 62 according to the detected type (e.g. physical layer standard and/or vendor) of HSE card 44. For example, in some embodiments no firmware is downloaded if the detected type of HSE card 44 is CX4, while appropriate firmware corresponding to the card type is downloaded to HSE card 44 if the detected card type is SFP+ or 10 GBaseT and the PHY vendor requires a firmware download. Microcontroller 80 may reset HSE card 44 following completion of the firmware upload.

In a step 118, the type(s) of physical media 50-0-1 connected to connectors 48-0-1 are determined, for example using firmware running on microcontroller 80 and/or programmable processor 62. The type(s) of physical media may include copper and optical media, and subtypes within copper and optical media. For example, for an HSE card 44 of a type supporting optical connections (e.g. SFP+ or CX4), potentially suitable physical media may include LR (long range), SR (short range), and LRM (long reach multimode) optical modules, among others. Determining the type(s) of physical media may include interrogating physical media 50-0-1 through connectors 48-0-1, respectively. In some embodiments, each physical medium 50-0-1 may include a non-volatile memory (e.g. EEPROM) storing an identifier of the type (including subtype, if any) of physical medium/module. The contents of such non-volatile memory may be read into configuration registers 69-0-1.

A set of initial parameters of HSE card 44 are then configured in a step 120, for example using firmware running on microcontroller 80. Such initial parameters may include a set of communication channel parameters for each HS MAC-PHY communication channel, as well as HS PHY parameters such as a number of taps used by one or more DSP processors implementing all or part of the functions of HS PHYs 68-0-1. HS MAC-PHY communication channel parameters may depend on the channel (electrical signal) characteristics between HS MACs 54-0-1 and HS PHYs 68-0-1, respectively. In some embodiments, such communication channel parameters include transmit (Tx) strength, receive (Rx) sensitivity, Tx pre-emphasis and post-emphasis, and Rx equalization. HSE PHYs 68-0-1 are configured by writing data (e.g. identifiers(s) of detected physical media types) to internal configuration registers 69-0-1 according to the detected physical media type(s) in order to support communication over the detected physical media type(s) (step 122). For example, for an SFP+ HSE card, the type of physical media may include copper, short-range fiber (SR), long-range fiber (LR), or long-reach multimode fiber (LRM).

In a step 124, a set of parameters of base NIC 24 and/or the host are configured according to available port speeds (e.g. how many high-speed ports are present or active, if any), type/standard of HSE card 44, and/or type/standard of physical media 50-0-1 connected to HSE card 44. Configuring base NIC parameters may include enabling or configuring support for Wake-on-LAN (WOL) operation, allocating MAC addresses, configuring 4-tuple and/or 5-tuple packet filters, allocating on-board buffer space, and configuring an arbitration and priority scheme for connected ports. Configured host driver parameters may include IP address, ring buffer size, and interrupt moderation parameter(s), among others. In a system including multiple driver instantiations of a common driver, each instantiation may be configured according to different configuration parameters (e.g. according to a corresponding port speed). Step 124 may also include configuring a host teaming driver to reflect the connection configuration/personality of NIC 20.

In a step 126, firmware running on programmable processor 62 is used to control an operation of NIC 20 according to parameters including configured parameters described above. For example, such firmware may be used to arbitrate access by the host driver instantiation(s) to the low- and high-speed ports of NIC 20, to ensure fairness, and to allocate resources such as bufferpools to ports according to port speeds. Such firmware may also be used, in conjunction with flow classifier 58, to map any low- and/or high-speed physical port to any PCI functions of host interface 76. In some embodiments, all correspondences between cores 62-0-4, MACs 52-0-3, 54-0-1, and/or PCIs functions of host interface 76 are programmable, under the control of firmware running on processor 62.

Figure 5:
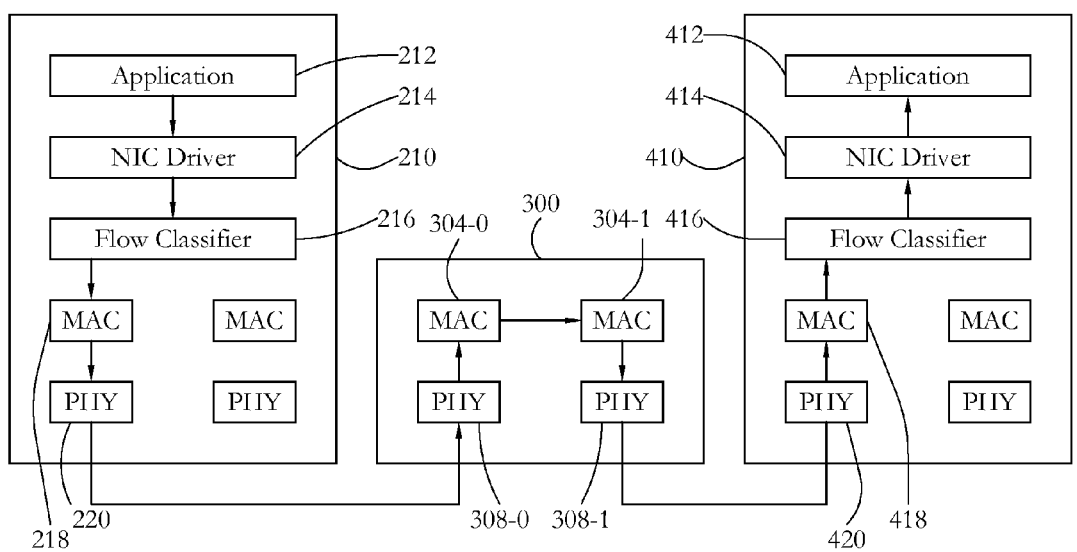
FIG. 5 shows an exemplary message path from a first server through a switch to a second server according to some embodiments of the present invention.

FIG. 5 shows an exemplary message path from a first server 210 through a switch 300 to a second server 410 according to some embodiments of the present invention. A message initiated by an application 212 (OSI layer 7) of server 210 is processed by, among others, a common NIC driver 214, flow classifier 216, MAC 218 and PHY 220 before being transmitted to switch 300. The message is processed in switch 300 by a PHY 308-0, MAC 304-0, MAC 304-1 and PHY 308-1 before transmission to server 410. At server 410, the message is processed by a PHY 420, MAC 418, flow classifier 416, and common NIC driver 414 before being received by an application 412. After processing by flow classifier 58, data received over all low- and high-speed connectors 48-0-1, 32-0-3 is processed by one or more instantiations of a common driver. The common driver is also used to control the transmission of data over all low- and high-speed connectors 48-0-1, 32-0-3.

FIG. 6-A shows a lateral view of an exemplary 1U (one rack unit) rack mount hardware configuration allowing the attachment of a high-speed PHY module to a system motherboard according to some embodiments of the present invention. Base NIC IC 24 and connector 36a are mounted on a planar printed circuit board (PCB) support 31. A cooling unit 88 is mounted on base NIC IC 24. Cooling unit 88 may include a heat sink, radiator, fan and/or other components for cooling base NIC IC 24. A riser card 92 includes a printed circuit board support 96 perpendicular to PCB support 31. Riser card 92 interconnects base circuit board 30 and expansion card 44 through connectors 36a-b. Expansion card 38 includes a PCB support 41, which is parallel to PCB support 31. HSE PHY IC 46 is mounted on PCB support 41, and a cooling unit 89 is mounted on HSE PHY IC 46, for cooling HSE PHY IC 46. FIG. 6-B shows exemplary dimensions of the hardware configuration of FIG. 6-A disposed in a housing 98 according to some embodiments of the present invention. As shown, the components of FIG. 6-A may be sized to fit within 44.45 mm (1.75"), the height of a standard 1 rack unit (1 U) enclosure.

It will be clear to one skilled in the art that the above embodiments may be altered in many ways without departing from the scope of the invention. For example, various different numbers of ports and combinations of port speeds others than the exemplary ones explicitly described above may be used. Systems and methods as described above may be employed with Fibre Channel or other networking protocol connections; such systems and methods may use Fibre Channel or other protocol-appropriate physical media, physical medium connectors, physical layer processors, and data link layer controllers. Accordingly, the scope of the invention should be determined by the following claims and their legal equivalents.

What is claimed is:

1. An apparatus comprising:
   a computer server motherboard comprising
      a base network interface controller integrated circuit comprising:
         a set of low-speed media access controllers (MACs),
         a set of high-speed MACs,
         a programmable processor connected to the low-speed MACs and high-speed MACs; and
         a set of low-speed physical layer processor (PHY) devices, each low-speed PHY device being connected to a corresponding low-speed MAC for the base network interface controller integrated circuit; and
      a high-speed physical layer device expansion card removably connected to the computer server motherboard, the high-speed physical controller expansion card comprising a set of high-speed physical layer processor (PHY) devices, each high-speed PHY device being connected to a high-speed MAC of the base network interface controller integrated circuit;
   wherein the programmable processor is programmed to
      determine a type of the high-speed physical layer device expansion card connected to the computer server motherboard, wherein determining the type of the high-speed physical layer device expansion card includes determining a physical layer standard of the high-speed physical layer device expansion card; and
      configure the base network interface controller integrated circuit or the high-speed physical layer device expansion card according to the determined type of the high-speed physical layer device expansion card.

2. The apparatus of claim 1, wherein the programmable processor is programmed to configure the base network interface controller integrated circuit according to the determined type of the high-speed physical layer device expansion card.

3. The apparatus of claim 2, wherein configuring the base network interface controller integrated circuit according to the determined type of the high-speed physical layer device expansion card comprises configuring a host interface of the base network interface controller integrated circuit.

4. The apparatus of claim 1, wherein the programmable processor is programmed to configure the high-speed physical layer device expansion card according to the determined type of the high-speed physical layer device expansion card.

5. The apparatus of claim 4, wherein configuring the high-speed physical layer device expansion card comprises directing a download of a set of firmware code to the high-speed physical layer device expansion card.

6. The apparatus of claim 4, wherein configuring the base network interface controller integrated circuit or the high-speed physical layer device expansion card comprises setting a value of a communications channel parameter for a communications channel between a high-speed MAC and a corresponding high-speed PHY.

7. The apparatus of claim 1, wherein the programmable processor is programmed to determine a type of physical medium connected to the high-speed physical layer device expansion card, and to configure the high-speed physical layer device expansion card according to the determined type of the physical medium.

8. The apparatus of claim 1, wherein the base network interface controller integrated circuit further comprises a flow classifier connected to the set of low-speed MACs and the set of high-speed MACs and configured to classify low-speed port data corresponding to the set of low-speed MACs and high-speed port data corresponding to the set of high-speed MACs.

9. The apparatus of claim 1, wherein the computer server motherboard further comprises a host processor connected to the set of low-speed MACs and the set of high-speed MACs and programmed to execute a set of driver software instructions implementing a common network interface driver for communicating the low-speed port data and the high-speed port data.

10. The apparatus of claim 1, wherein the set of low-speed MACs includes at least one 1 Gbps MAC, and the set of high-speed MACs includes at least one 10 Gbps MAC.

11. A method comprising:
   removably connecting a high-speed physical layer device expansion card to a computer server motherboard, wherein
      the computer server motherboard comprises a base network interface controller integrated circuit comprising
         a set of low-speed media access controllers (MACs), and
         a set of high-speed MACs, and
      the high-speed physical layer device expansion card comprises a set of high-speed physical layer processor (PHY) devices, each high-speed PHY device being connected to a high-speed MAC of the base network interface controller integrated circuit; and
   employing a programmable processor of the computer server motherboard to
      determine a type of the high-speed physical layer device expansion card connected to the computer server motherboard, wherein determining the type of the high-speed physical layer device expansion card includes determining a physical layer standard of the high-speed physical layer device expansion card, and
      configure the base network interface controller integrated circuit or the high-speed physical layer device expansion card according to the determined type of the high-speed physical layer device expansion card.

12. The method of claim 11, further comprising:
   establishing a set of low-speed network connections to the computer server motherboard through the set of low-speed MACs; and
   establishing a set of high-speed network connections to the computer server motherboard through the set of high-speed PHY devices and the set of high-speed MACs.

13. The method of claim 11, wherein the programmable processor is programmed to configure the base network interface controller integrated circuit according to the determined type of the high-speed physical layer device expansion card.

14. The method of claim 13, wherein configuring the base network interface controller integrated circuit according to the determined type of the high-speed physical layer device expansion card comprises configuring a host interface of the base network interface controller integrated circuit.

15. The method of claim 11, wherein the programmable processor is programmed to configure the high-speed physical layer device expansion card according to the determined type of the high-speed physical layer device expansion card.

16. The method of claim 15, wherein configuring the high-speed physical layer device expansion card comprises directing a download of a set of firmware code to the high-speed physical layer device expansion card.

17. The method of claim 15, wherein configuring the high-speed physical layer device expansion card comprises setting a value of a communications channel parameter for a communications channel between a high-speed MAC and a corresponding high-speed PHY.

18. The method of claim 11, wherein the programmable processor is programmed to determine a type of physical medium connected to the high-speed physical layer device expansion card, and to configure the high-speed physical layer device expansion card according to the determined type of the physical medium.

19. The method of claim 11, wherein the base network interface controller integrated circuit further comprises a flow classifier connected to the set of low-speed MACs and the set of high-speed MACs and configured to classify low-speed port data corresponding to the set of low-speed MACs and high-speed port data corresponding to the set of high-speed MACs.

20. The method of claim 11, further comprising employing a common network interface driver to control the low-speed network connections and the high-speed network connections.

21. The method of claim 11, wherein the set of low-speed MACs includes at least one 1 Gbps MAC, and the set of high-speed MACs includes at least one 10 Gbps MAC.

22. An apparatus comprising:
a base network interface controller board comprising:
a set of low-speed media access controllers (MACs),
a set of low-speed physical layer processor (PHY) devices, each low-speed PHY device being connected to a low-speed MAC, and
a set of high-speed MACs, and
a high-speed physical layer device expansion card removably connected to the base network interface controller board, the high-speed physical layer device expansion card comprising a set of high-speed PHY devices, each high-speed PHY device being connected to a high-speed MAC of the base network interface controller board;
wherein the base network interface controller board is configured to
determine a type of the high-speed physical layer device expansion card connected to the base network interface controller board, wherein determining the type of the high-speed physical layer device expansion card includes determining a physical layer standard of the high-speed physical layer device expansion card, and
configure the base network interface controller board or the high-speed physical layer device expansion card according to the determined type of the high-speed physical layer device expansion card.

23. The apparatus of claim 22, wherein the base network interface controller board comprises a programmable processor connected to the low-speed MACs and high-speed MACs, and programmed to determine the type of the high-speed physical layer device expansion card connected to the base network interface controller board, and to configure the base network interface controller board or the high-speed physical layer device expansion card according to the determined type of the high-speed physical layer device expansion card.

24. The apparatus of claim 23, wherein the programmable processor is programmed to configure the base network interface controller board according to the determined type of the high-speed physical layer device expansion card.

25. The apparatus of claim 24, wherein configuring the base network interface controller board according to the determined type of the high-speed physical layer device expansion card comprises configuring a host interface of the base network interface controller board.

26. The apparatus of claim 23, wherein the programmable processor is programmed to configure the high-speed physical layer device expansion card according to the determined type of the high-speed physical layer device expansion card.

27. The apparatus of claim 26, wherein configuring the high-speed physical layer device expansion card comprises directing a download of a set of firmware code to the high-speed physical layer device expansion card.

28. The apparatus of claim 26, wherein configuring the high-speed physical layer device expansion card comprises setting a value of a communications channel parameter for a communications channel between a high-speed MAC and a corresponding high-speed PHY.

29. The apparatus of claim 22, wherein the base network interface controller board is configured to determine a type of physical medium connected to the high-speed physical layer device expansion card, and to configure the high-speed physical layer device expansion card according to the determined type of the physical medium.

30. The apparatus of claim 22, wherein the base network interface controller board further comprises a flow classifier connected to the set of low-speed MACs and the set of high-speed MACs and configured to classify low-speed port data corresponding to the set of low-speed MACs and high-speed port data corresponding to the set of high-speed MACs.

31. The apparatus of claim 22, wherein the base network interface controller board further comprises a host processor connected to the set of low-speed MACs and the set of high-speed MACs and programmed to execute a set of driver software instructions implementing a common network interface driver for communicating the low-speed port data and the high-speed port data.

32. The apparatus of claim 22, wherein the set of low-speed MACs includes at least one 1 Gbps MAC, and the set of high-speed MACs includes at least one 10 Gbps MAC.

33. A method comprising:
removably connecting a high-speed physical layer device expansion card to a base network interface controller board, wherein
the base network interface controller board comprises
a set of low-speed media access controllers (MACs),
a set of low-speed physical layer processor (PHY) devices, each low-speed PHY device being connected to a low-speed MAC, and
a set of high-speed MACs, and
the high-speed physical controller expansion card comprises a set of high-speed PHY devices, each high-speed PHY device being connected to a high-speed MAC of the base network interface controller integrated circuit; and
employing the base network interface controller board to
determine a type of the high-speed physical layer device expansion card connected to the base network interface controller board, wherein determining the type of the high-speed physical layer device expansion card includes determining a physical layer standard of the high-speed physical layer device expansion card, and
configure the base network interface controller board or the high-speed physical layer device expansion card according to the determined type of the high-speed physical layer device expansion card.

34. The method of claim 33, further comprising:
establishing a set of low-speed network connections to the base network interface controller board through the set of low-speed PHY devices and the set of low-speed MACs; and establishing a set of high-speed network connections to the base network interface controller board through the set of high-speed PHY devices and the set of high-speed MACs.

35. The method of claim 33, wherein the base network interface controller board comprises a programmable processor connected to the low-speed MACs and high-speed MACs, and programmed to determine the type of the high-speed physical layer device expansion card connected to the base network interface controller board, and to configure the base network interface controller board or the high-speed physical layer device expansion card according to the determined type of the high-speed physical layer device expansion card.

36. The method of claim 35, wherein the programmable processor is programmed to configure the base network interface controller board according to the determined type of the high-speed physical layer device expansion card.

37. The method of claim 36, wherein configuring the base network interface controller board according to the determined type of the high-speed physical layer device expansion card comprises configuring a host interface of the base network interface controller board.

38. The method of claim 35, wherein the programmable processor is programmed to configure the high-speed physical layer device expansion card according to the determined type of the high-speed physical layer device expansion card.

39. The method of claim 38, wherein configuring the high-speed physical layer device expansion card comprises directing a download of a set of firmware code to the high-speed physical layer device expansion card.

40. The method of claim 38, wherein configuring the base network interface controller board or the high-speed physical layer device expansion card comprises setting a value of a communications channel parameter for a communications channel between a high-speed MAC and a corresponding high-speed PHY.

41. The method of claim 33, wherein the base network interface controller board is configured to determine a type of physical medium connected to the high-speed physical layer device expansion card, and to configure the high-speed physical layer device expansion card according to the determined type of the physical medium.

42. The method of claim 33, wherein the base network interface controller board further comprises a flow classifier connected to the set of low-speed MACs and the set of high-speed MACs and configured to classify low-speed port data corresponding to the set of low-speed MACs and high-speed port data corresponding to the set of high-speed MACs.

43. The method of claim 33, wherein the base network interface controller board further comprises a host processor connected to the set of low-speed MACs and the set of high-speed MACs and programmed to execute a set of driver software instructions implementing a common network interface driver for communicating the low-speed port data and the high-speed port data.

44. The method of claim 33, wherein the set of low-speed MACs includes at least one 1 Gbps MAC, and the set of high-speed MACs includes at least one 10 Gbps MAC.

45. An apparatus comprising:
a base network interface controller integrated circuit comprising:
a set of low-speed media access controllers (MACs),
a set of high-speed MACs, and
a programmable processor connected to the low-speed MACs and high-speed MACs; and
a high-speed physical layer device expansion card connector coupled to the base network interface controller integrated circuit, for removably connecting the base network interface controller integrated circuit to a high-speed physical layer device expansion card, the high-speed physical controller expansion card comprising a set of high-speed physical layer processor (PHY) devices;
wherein connecting the base network interface controller integrated circuit to the high-speed physical controller expansion card connects each high-speed PHY device of the high-speed physical layer device expansion card to a high-speed MAC of the base network interface controller integrated circuit; and
wherein the programmable processor is programmed to
determine a type of the high-speed physical layer device expansion card connected to the base network interface controller integrated circuit, wherein determining the type of the high-speed physical layer device expansion card includes determining a physical layer standard of the high-speed physical layer device expansion card, and
configure the base network interface controller integrated circuit or the high-speed physical layer device expansion card according to the determined type of the high-speed physical layer device expansion card.

* * * * *

UNITED STATES PATENT AND TRADEMARK OFFICE
CERTIFICATE OF CORRECTION

PATENT NO.        : 8,069,293 B1
APPLICATION NO.   : 12/471331
DATED             : November 29, 2011
INVENTOR(S)       : Gary Rogan et al.

It is certified that error appears in the above-identified patent and that said Letters Patent is hereby corrected as shown below:

On Page 2, in column 1, line 6, under "Other Publications", delete "1OG" and insert -- 10G --, therefor.

In drawing sheet 3 of 6, figure 2, in Reference Numeral 68-0, line 1, delete "I IS" and insert -- HS --, therefor.

In drawing sheet 3 of 6, figure 2, in Reference Numeral 68-1, line 1, delete "I IS" and insert -- HS --, therefor.

In drawing sheet 4 of 6, figure 4, in Reference Numeral 116, line 1, delete "I ISE" and insert -- HSE --, therefor.

In drawing sheet 4 of 6, figure 4, in Reference Numeral 116, line 1, delete "I ISE" and insert -- HSE --, therefor.

In drawing sheet 5 of 6, figure 5, in Reference Numeral 210, line 5, delete "PI IY" and insert -- PHY --, therefor.

In drawing sheet 5 of 6, figure 5, in Reference Numeral 220, line 1, delete "PI IY" and insert -- PHY --, therefor.

In drawing sheet 5 of 6, figure 5, in Reference Numeral 308-0, line 1, delete "PI IY" and insert -- PHY --, therefor.

In drawing sheet 5 of 6, figure 5, in Reference Numeral 308-1, line 1, delete "PI IY" and insert -- PHY --, therefor.

In drawing sheet 5 of 6, figure 5, in Reference Numeral 410, line 5, delete "PI IY" and insert -- PHY --, therefor.

Signed and Sealed this
Seventh Day of February, 2012

David J. Kappos
*Director of the United States Patent and Trademark Office*

CERTIFICATE OF CORRECTION (continued)
U.S. Pat. No. 8,069,293 B1

In drawing sheet 5 of 6, figure 5, in Reference Numeral 420, line 1, delete "PI IY" and insert -- PHY --, therefor.

In column 3, line 63, delete "1 U" and insert -- 1U --, therefor.

In column 7, line 49, delete "(I/O)" and insert -- (1/0) --, therefor.

In column 12, line 58, delete "(1 U)" and insert -- (1U) --, therefor.